US008966098B2

(12) United States Patent
Jibbe et al.

(10) Patent No.: US 8,966,098 B2
(45) Date of Patent: Feb. 24, 2015

(54) METHOD AND/OR APPARATUS FOR CERTIFYING AN OUT OF BAND MANAGEMENT APPLICATION IN AN EXTERNAL STORAGE ARRAY

(75) Inventors: Mahmoud K. Jibbe, Wichita, KS (US); Krishanu Dhar, Karnataka (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 310 days.

(21) Appl. No.: 13/049,206

(22) Filed: Mar. 16, 2011

(65) Prior Publication Data

US 2011/0167295 A1    Jul. 7, 2011

Related U.S. Application Data

(63) Continuation of application No. PCT/US2008/012964, filed on Nov. 20, 2008.

(60) Provisional application No. 61/100,034, filed on Sep. 25, 2008.

(51) Int. Cl.
| | |
|---|---|
| *G06F 15/16* | (2006.01) |
| *G06F 9/44* | (2006.01) |
| *G06F 11/22* | (2006.01) |
| *H04L 29/08* | (2006.01) |
| *G06F 3/06* | (2006.01) |

(52) U.S. Cl.
CPC ........ *G06F 11/2247* (2013.01); *H04L 67/1097* (2013.01); *G06F 3/0689* (2013.01); *G06F 3/067* (2013.01)
USPC ........... 709/228; 709/227; 709/229; 717/124; 717/168

(58) Field of Classification Search
CPC .... H04L 67/1097; G06F 3/067; G06F 3/0689
USPC .................. 709/227, 228, 229; 717/124, 168
See application file for complete search history.

(56) References Cited

U.S. PATENT DOCUMENTS

| | | | |
|---|---|---|---|
| 5,546,535 A | 8/1996 | Stallmo et al. ........... 395/182.07 |
| 5,867,736 A | 2/1999 | Jantz .............................. 395/894 |
| 6,738,937 B1 * | 5/2004 | Bergsten ....................... 714/718 |
| 7,308,397 B2 * | 12/2007 | Jibbe et al. ....................... 703/24 |
| 7,844,444 B1 * | 11/2010 | Asbridge et al. ................. 703/23 |
| 2003/0135785 A1 | 7/2003 | Carr ................................ 714/25 |
| 2003/0167327 A1 * | 9/2003 | Baldwin et al. ............... 709/225 |
| 2004/0268113 A1 | 12/2004 | Rothman et al. .................. 713/2 |
| 2005/0060526 A1 | 3/2005 | Rothman et al. .................. 713/1 |
| 2005/0102433 A1 | 5/2005 | Balasubramanian et al. .... 710/1 |
| 2005/0289296 A1 * | 12/2005 | Balasubramanian ......... 711/114 |
| 2006/0010275 A1 * | 1/2006 | Moon et al. .................... 710/302 |

(Continued)

FOREIGN PATENT DOCUMENTS

| | | | |
|---|---|---|---|
| CN | 1359492 A | 7/2002 | ............. G06F 11/00 |
| JP | 2002-132534 | 5/2002 | ............. G06F 11/22 |

(Continued)

*Primary Examiner* — Hieu Hoang
(74) *Attorney, Agent, or Firm* — Christopher P. Maiorana, PC (57) ABSTRACT

A method for configuring a storage array, comprising the steps of (A) configuring the storage array with a minimal number of components for initial testing; (B) sending a first symbol call command to the storage array to initiate a test of a structure of the storage array; (C) receiving a response from the storage array; and (D) determining whether the test passed in response to the response.

20 Claims, 6 Drawing Sheets

(56) References Cited

U.S. PATENT DOCUMENTS

2006/0271608 A1  11/2006 Qi et al. .................. 707/205
2007/0050664 A1   3/2007 Tan et al. ..................... 714/5
2008/0140724 A1*  6/2008 Flynn et al. ............. 707/104.1

FOREIGN PATENT DOCUMENTS

JP      2005-70835    3/2005   .............. G06F 11/28
JP      2005-165556   6/2005   ................ G06F 3/06

* cited by examiner

METHOD AND/OR APPARATUS FOR CERTIFYING AN OUT OF BAND MANAGEMENT APPLICATION IN AN EXTERNAL STORAGE ARRAY

This is a continuation of International Application PCT/US2008/012964, with an International Filing Date of Nov. 20, 2008, which claims the priority to U.S. Provisional Application No. 61/100,034, filed Sep. 25, 2008, each of which is incorporated by reference in its entirety.

FIELD OF THE INVENTION

The present invention relates to storage arrays generally and, more particularly, to a method and/or apparatus for certifying an out of band management application in an external storage array.

BACKGROUND OF THE INVENTION

Conventional test environments encounter various issues. A client interface can send the correct command but the array might be in a non-responding state. Therefore, the array either does not respond at all or responds with incorrect information. In such a scenario, an engineer often spends time troubleshooting the configuration. The problem might have an easy solution, but more likely than not considerable man hours are spent debugging such a problem.

Conventional approaches do not provide a straight forward solution to this problem. If a conventional array runs into a configuration issue, the conventional solution is to debug the problem to find a fix. Conventional approaches have a number of disadvantages. With such conventional approaches one must be ready to spend time troubleshooting. Hours of engineering time can be spent bringing a storage array to an optimal state.

It would be desirable to implement a method and/or apparatus for certifying an out of band management application in an external storage array.

SUMMARY OF THE INVENTION

The present invention concerns a method for configuring a storage array, comprising the steps of (A) configuring the storage array with a minimal number of components for initial testing, (B) sending a first symbol call command to the storage array to initiate a test of a structure of the storage array, (C) receiving a response from the storage array, and (D) determining whether the test passed in response to the response.

Objects, features and advantages of the present invention include providing a device, such as a snooper device, that may (i) capture a symbol call (and corresponding response) from an array (e.g., in the form of an Object Graph Structure), (ii) provide a mechanism of interpreting a symbol call and a link to a proper symbol response, (iii) remove the need for additional hardware to certify Out Of Band SANtricity in different environments (e.g., Operating Systems) and/or (iv) be used in block Storage Array Network products (e.g., SAN) or Network Array Storage (NAS).

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
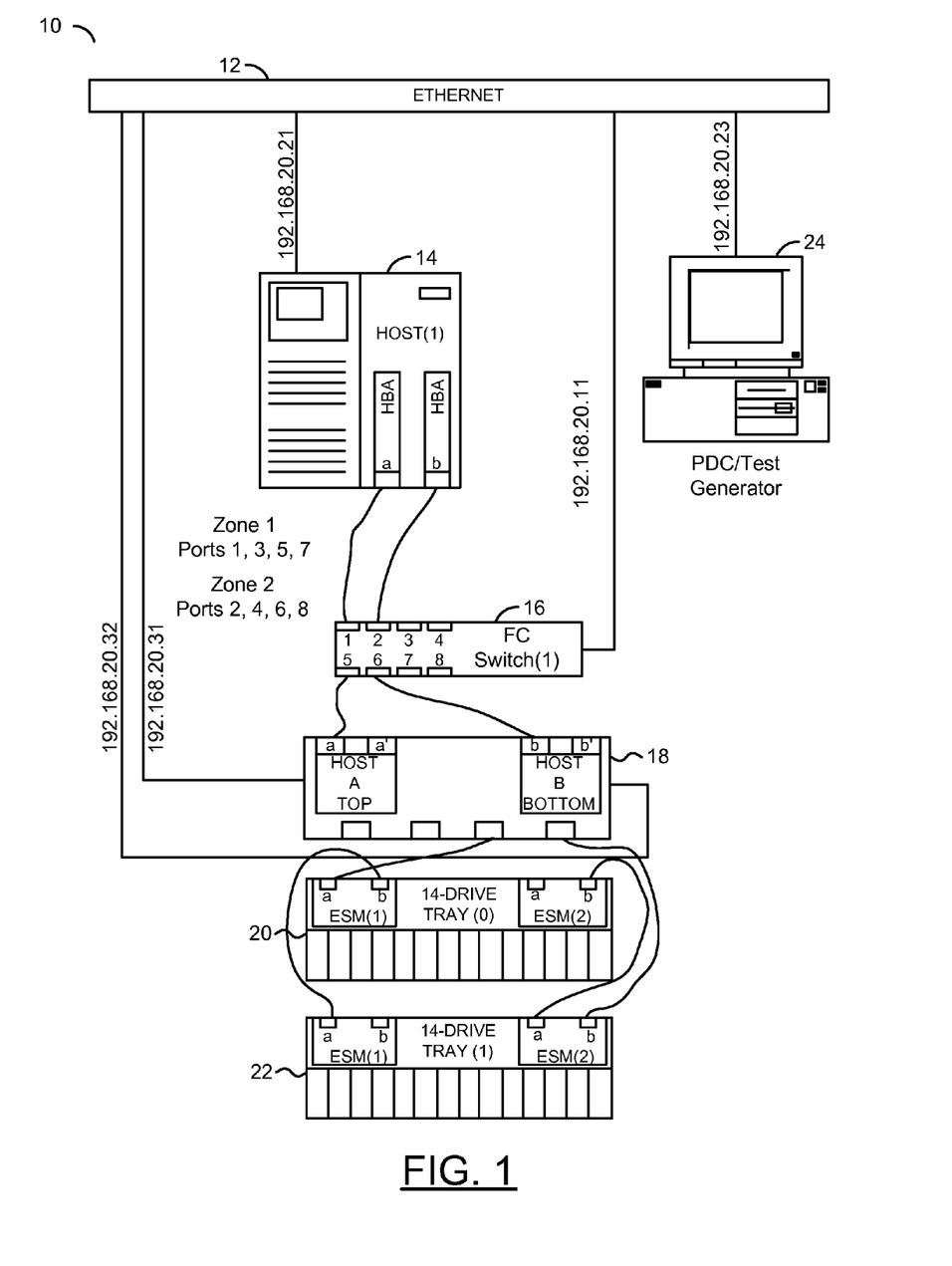
FIG. 1 is a block diagram of an array configuration.

Referring to FIG. 1 a block diagram of a system 10 is shown implementing a typical array configuration. The system 10 includes a block 12, a block (or circuit) 14, a block (or circuit) 16, a block or (circuit) 18, a block (or circuit) 20, a block (or circuit) 22 and a block (or circuit) 24. The block 12 represents an Ethernet network. The block 14 represents a host device. The block 16 represents a fibre channel (FC) switch. The block 18 represents a storage array (or controller). The block 20 represents a drive tray. The block 22 represents a drive tray. The block 24 represents a test generator. The system 10 illustrates an array configuration that has out of band management over the ethernet network 12.

One embodiment of the present invention may eliminate the storage array 18 and the drive trays 20 and 22 during iterative testing of the configuration. The storage array 18 and the drive trays 20 and 22 may be replaced with a device known to have capabilities to (i) send and receive frames over the Ethernet network 12, (ii) provide snooper functionality and/or (iii) provide the capability to store an Object Graph for the different symbol calls in an XML file.

If a symbol call needs to be tested through Out Of Band management, the host 14 makes the function call encapsulated in a TCP/IP packet to the storage array 18. The storage array 18 may receive the call and execute the call. The storage array 18 may send an appropriate return code to a client and populate the structure in an Object Graph. Once the host 14 deciphers the data in the Object Graph, the host 14 displays the appropriate information in a graphical user interface (GUI).

Figure 2:
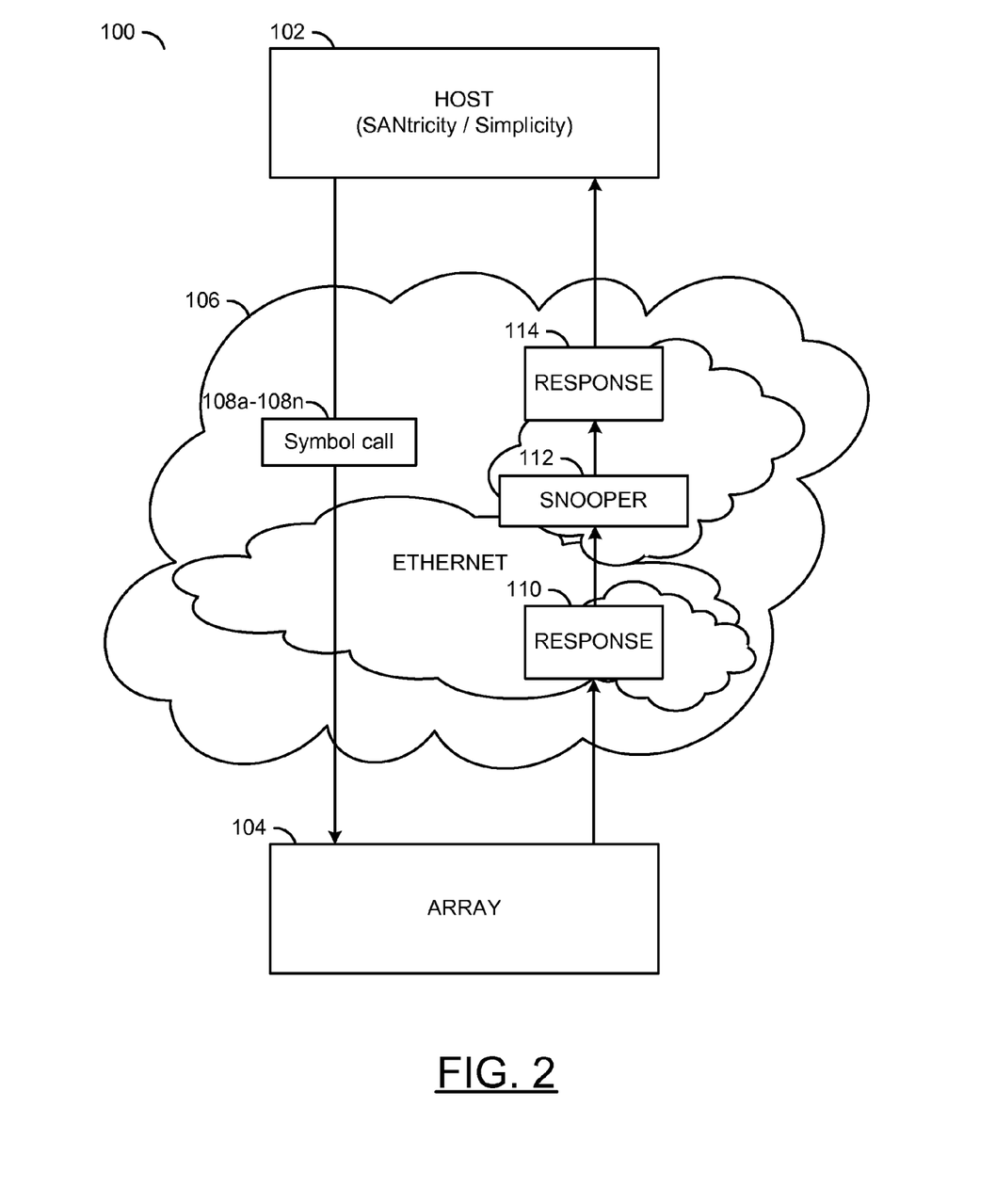
FIG. 2 is a block diagram of an embodiment of the invention in a data capture phase.

Referring to FIG. 2, a block diagram of system 100 is shown in accordance with an example of a preferred embodiment of the present invention. The system 100 generally comprises a block (or circuit) 102, a block (or circuit) 104, and a block 106. The circuit 102 may be implemented as a host circuit. In one example, the circuit 102 may be implemented as a SANtricity/Simplicity circuit (or module). The block 104 may be a storage array. For example, the block 104 may represent an array of disk drives or other storage devices (e.g., solid state storage, etc.). The block 106 may represent a network (e.g., an Ethernet network). The network 106 generally comprises a number of blocks 108a-108n, a block (or circuit) 110, a block (or circuit) 112, and a block (or circuit) 114. The blocks 108a-108n may each represent a symbol call to the storage array 104. The block 110 may represent a response from the storage array 104. The block 112 may be implemented as a snooper circuit. The block 114 may represent another response received from the array 104. Additional responses 110 and/or 114 may be implemented.

Various embodiments of the system 100 have multiple benefits. For example, the necessity of the storage array 104 during testing may be eliminated. The storage array 104 may be used once while building the database for the device. Such an implementation may reduce the risk of running into a configuration issue when operating the storage array 104 after testing has been completed. In another example, the responses 110 or 114 sent by the storage array 104 in response to one of the symbol calls 108a-108n from the host 102 are not generally operating system (OS) dependant. The symbol calls 108a-108n may be initiated from the host 102 (or another host connected to the network 106) running any type of operating system. In another example, the time needed to test the symbol calls 108a-108n will normally be less than the testing time in an environment without the system 100 since the host 102 does not have to wait for the operation on the storage array 104 to complete. The system 100 may reduce resources needed to certify management applications.

The flow of testing the storage array 104 may be broken down into two phases (i) the data capture phase and (ii) the data retrieval phase. The data capture phase may use a minimum configuration of the host 102, the snooper device 112 and the array 104. The host 102 may normally have a SANtricity/Simplicity application installed as a hardware device and/or as a software application.

Figure 3:
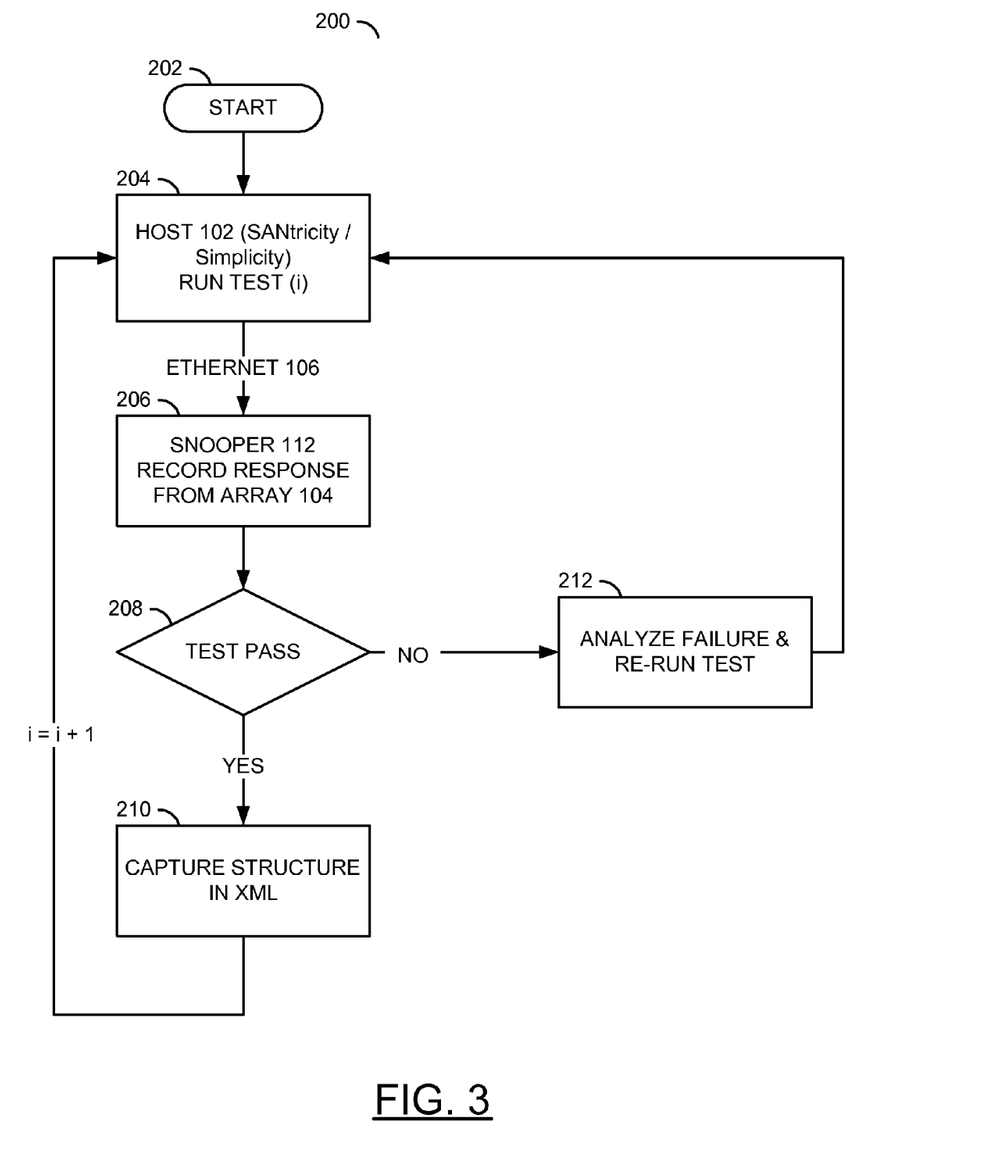
FIG. 3 is a flow chart of the process of an embodiment of the invention in the data capture phase.

Referring to FIG. 3, a diagram of a process 200 is shown. The process 200 may illustrate the system 100 in the data capture phase. The process 200 generally comprises a step (or state) 202, a step (or state) 204, a step (or state) 206, a decision step (or state) 208, a step (or state) 210 and a step (or state) 212. The step 202 may start the process 200. The step 204 may instruct the host 102 (e.g., SANtricity/Simplicity) to run an initial test (e.g., a test i). The step 206 may instruct the snooper 112 to record the response 110 from the storage array 104. The decision step 208 may determine if the test passes. If the test passes, then the process 200 may continue to the step 210. The step 210 may capture the structure in an XML file. While an XML file is mentioned, other types of files may be implemented (e.g., HTML, TXT, etc.). If the test does not pass, then the process 200 may move to the step 212. The step 212 may analyze the failure and re-run the test. After the process 200 moves to the step 212 then the process 200 may return to step 204.

The testing described may include one or more of a variety of tests. In one example, a suite of tests may be implemented as one test after the next. For example, the first test in the suite may be to test the function of a create volume operation where i=0 (e.g., a variable 'i' gets initialized to zero). The host 102 may send a specific symbol call (e.g., CREATEVOLUME) with the relevant parameters to the storage array 104 over the Ethernet network 106. The storage array 104 may receive the symbol call CREATEVOLUME, execute the function requested, send back an appropriate return code (e.g., the response 110) and fill in an Object Graph. The following TABLE 1 illustrates an example of an Object Graph:

TABLE 1

VOLUME - 0xc0e2b84
volumeHandle: 0x2
raidLevel: 0x0
dssPrealloc: 0x1
absMaxSegSize: 0x200000
offline: 0x0
sectorOffset: 0xa00000
blk/segSize: 0x200/0x20000
capacity: 0x140000000
reconPriority: 0x1
preReadRedun: 0x0
media scan: 0x0/0x0
status/action: 0x1 OPTIMAL/0x1
cache: CMA CME RCA RCE WCA WCE
cache modifier: 0x8
readAheadMult: 0x1

TABLE 1-continued

WWN: 60 0a 0b 80 00 2f c0 4b 00 00 a3 9e 47 cb 98 54
volumeGroupRef: 04 00 00 00 60 0a 0b 80 00 2f c0 4b 00 00 a3 9c 47 cb 98 1d
volumeRef: 02 00 00 00 60 0a 0b 80 00 2f c0 4b 00 00 a3 9e 47 cb 98 54
currentMgr: 070000000000000000000001
preferredMgr: 070000000000000000000001
label: 00 76 00 6f 00 6c 00 75 00 6d 00 65 00 33
label: volume3
permissions: MAP = Y, SNAP = Y, FORMAT = Y
RECONFIG = Y, READ = Y, WRITE = Y
MIRROR PRIMARY = Y, MIRROR SECONDARY = Y
COPY SOURCE = Y, COPY TARGET = Y The snooper device 112 may then capture the return code 110 when the packet gets sent from the storage array 104. The return code 110 may be passed on to the host 102. Once the host 102 receives the return code 110 (e.g., RETCODE_OK), the host 102 may receive the Object Graph from the storage array 104 via a file (e.g., jRPC). The following TABLE 2 lists a number of return codes (e.g. responses 110 and 114) the array 104 may send to the host 102 for a particular symbol call:

TABLE 2

RETCODE_CANNOT_FORMAT_VOLUME
RETCODE_CONTROLLER_IN_SERVICE_MODE
RETCODE_DRIVE_NOT_EXIST
RETCODE_DRIVE_NOT_UNASSIGNED
RETCODE_ERROR
RETCODE_ILLEGAL_PARAM
RETCODE_INVALID_LABEL
RETCODE_MAX_VOLUMES_EXCEEDED
RETCODE_NO_HEAP
RETCODE_OK
RETCODE_RAID6_FEATURE_DISABLED
RETCODE_RAID6_FEATURE_UNSUPPORTED
RETCODE_TRY_ALTERNATE
RETCODE_VOLUME_GROUP_RECONSTRUCTING
RETCODE_VOLUME_GROUP_UNDERGOING_COPYBACK

While the Object Graph is being sent to the host 102, the snooper device 112 may capture the data in the packet, store the data locally (e.g., in an XML file) and pass the packet to the host 102. The host 102 may then prepare to execute the next test in the suite (e.g., i=i+1, where 'i' gets incremented by 1). If the test fails, analysis is generally done to determine the cause of the failure. Such a failed test may then be re-executed (e.g., i=0, where the value of 'i' remains unchanged).

The data capture phase generally takes place once in a particular iterative test cycle. In the data capture phase, the symbol calls 108a-108n pertaining to one operating system (e.g., Windows, etc.) may be tested. The object structures may be captured and stored locally. In the data retrieval phase, the symbol calls 108a-108n tested in the data capture phase may be tested for different operating systems (e.g., AIX, Linux, Solaris, HP-UX, etc.) using the technique explained in connection with FIG. 4.

Figure 4:
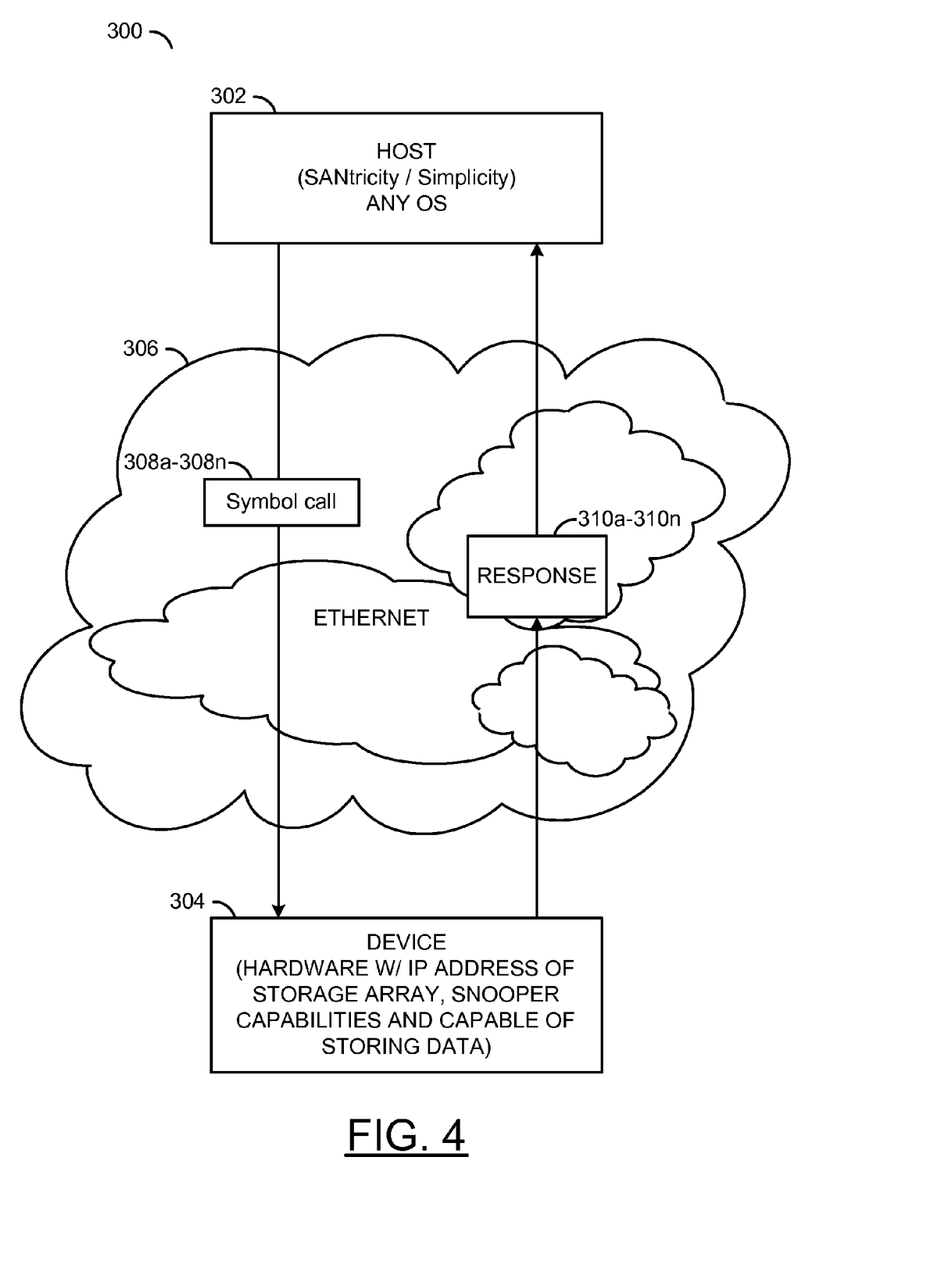
FIG. 4 is a block diagram of an embodiment of the invention in a data retrieval phase.

Referring to FIG. 4 a block diagram of system 300 is shown in the data retrieval phase. The system 300 generally comprises a block (or circuit) 302, a block (or circuit) 304, a block 306, a number of symbol calls 308a-308n, and a number of responses 310a-310n. The circuit 302 may be implemented as a host circuit. In one example, the host circuit 302 may be implemented as a SANtricity/Simplicity circuit. The host circuit 302 may run any one or more of a number of standard operating systems. The block 304 may be implemented as a device circuit. In one example, the device 304 may be implemented with hardware with an IP address of the storage array 104, snooper capabilities and/or the capability to store data (e.g., a memory). In one example, the data will be stored in an XML format. The block 306 may be implemented as a network (e.g., an Ethernet network).

In one implementation, the minimum configuration for the data retrieval phase may be the host 302 (with SANtricity/Simplicity installed) and the device 304 (with snooper like capability, a network interface and capable of storing the structure in an XML file). After the test suite completes in the data capture phase the below technique may be used to test the symbol calls 308a-308n from other operating systems. The suite may begin testing the calls in the suite in the same series of symbol calls 308a-308n as in the data capture phase.

The host 302 may send a specific symbol call (e.g., CREATEVOLUME) with similar parameters to the device 304 (e.g., i=0, where 'i' is initialized to zero). The device 304 may decipher the request using the snooper functionality, look up the return codes (e.g., the responses 310a-310n) for the symbol calls 308a-308n in storage and send the return codes 310a-310n to the host 302. Upon receiving a responses 310a-310n, the host 302 may send a request for the Object Graph to the device 304. An XML file that stores the structure of the Object Graph may then be sent to the host 302. The host 302 may then decipher the Object Graph and decide if the test is a success. If the test passes, the host 302 may proceed with the next test in the suite (e.g., i=i+1, where 'i' gets incremented by 1). In case of a failure the set up may have to be inspected for issues and the test will be re-executed (e.g., i=0, where the value of 'i' remains unchanged).

Figure 5:
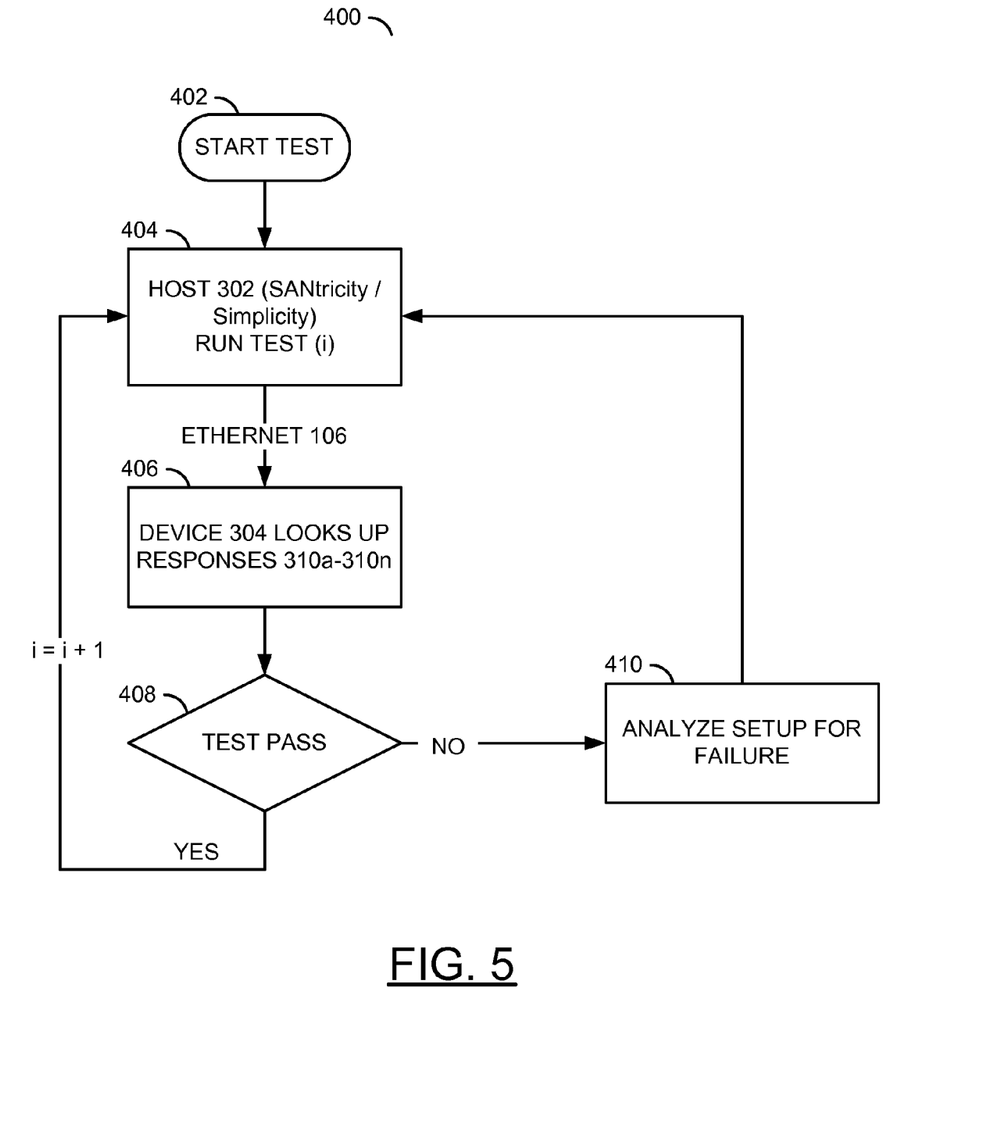
FIG. 5 is a flow chart of a process of an embodiment of the invention in the data retrieval phase.

Referring to FIG. 5, a diagram of a process 400 is shown. The process 400 may illustrate an example of the system 300 in the data retrieval phase. The process 400 may comprise an initiator step (or state) 402, a step (or state) 404, a step (or state) 406, a decision step (or state) 408 and a step (or state) 410. The step 402 may start the process 400. The step 404 may instruct the host 302 (SANtricity/Simplicity) to run a test (e.g., i). The step 406 may instruct the device 304 to look up the responses 310a-310n. The decision step 408 may decide if the test passes. If the test passes, then the process 400 returns to the step 404. If the test does not pass, then the process 400 goes to the step 410. The step 410 analyses the setup for failure. After the process 400 goes to the step 410, the process 400 returns to the step 404.

Figure 6:
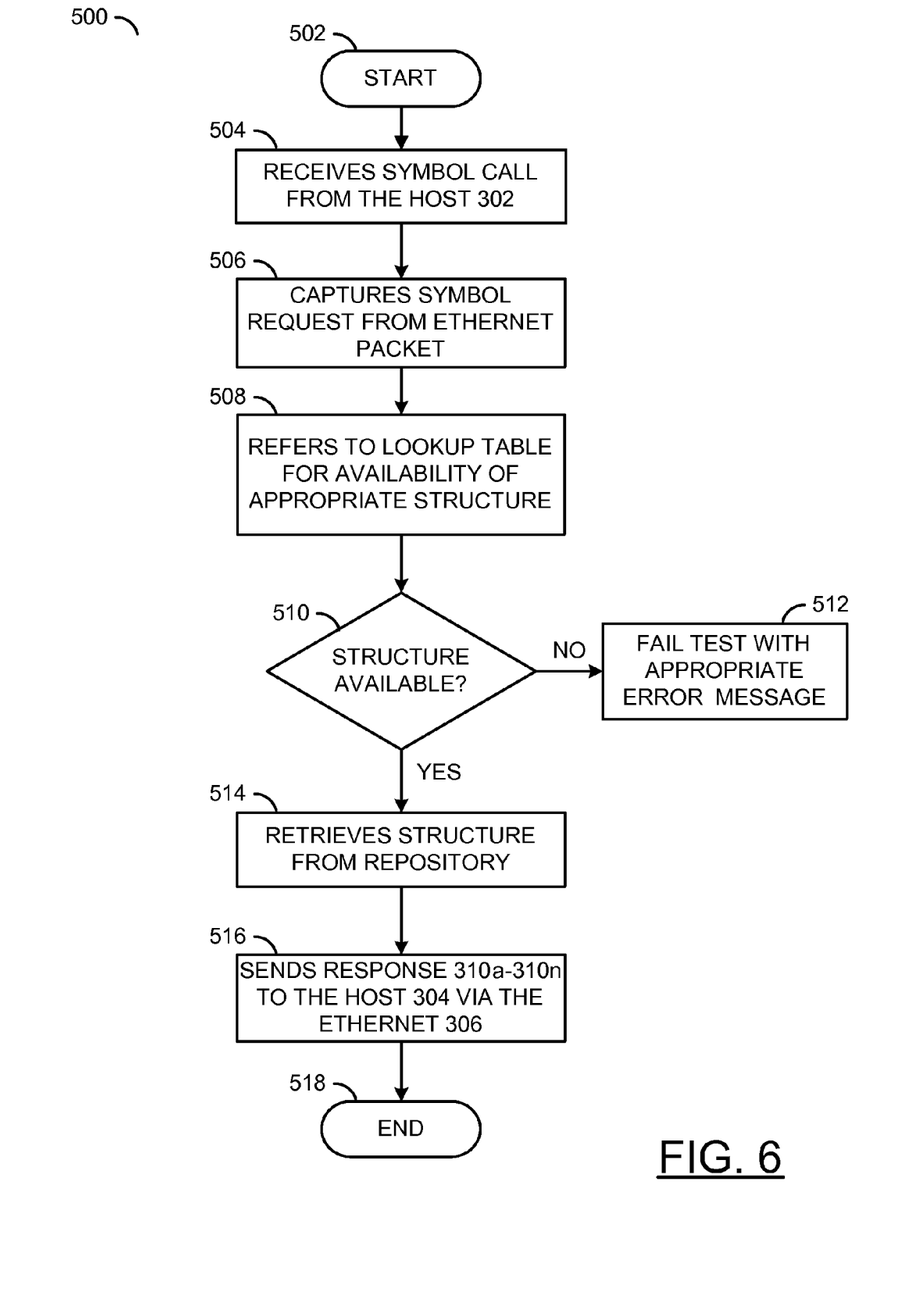
FIG. 6 is a more detailed flow chart in accordance with an embodiment of the present invention.

Referring to FIG. 6, a flow diagram of a process 500 is shown. The process 500 may illustrate the device 304 in the data retrieval phase. The process 500 comprises an initiator step (or state) 502, a step (or state) 504, a step (or state) 506, a step (or state) 508, a decision step (or state) 510, a step (or state) 512, a step (or state) 514, a step (or state) 516, and a step (or state) 518. The step 502 may start the process 500. In the step 504, the device 304 may receive a symbol call from the host 302. In the step 506, the device 304 may capture a symbol request from an Ethernet packet. In the step 508, the device 304 may refer to a lookup table (e.g., TABLE 1 or TABLE 2) for the availability of an appropriate structure. In the decision step 510, the device 304 may decide if the structure is available. If not, the process 500 moves to the step 512. In the step 512, the device 304 may fail the test with an appropriate error message (e.g., RESPONSE_NOT_AVAILABLE). If so, then the process 500 moves to the step 514. In the step 514, the device 304 may retrieve the structure from a repository. In the step 516, the device 304 may send the response 310a-310n to the host 302 via the Ethernet network 306. The step 518 may end the process 500.

The function performed by the flow diagrams of FIGS. 3, 5 and 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMS, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method for configuring a storage array, comprising the steps of:
    (A) configuring a device to use a database of said storage array for initial testing, wherein said device (i) operates using an IP address of a drive structure of said storage array and (ii) implements testing capabilities;
    (B) sending a first symbol call command to said device to initiate a test of said drive structure of said storage array stored in said database of said device;
    (C) receiving a response from said device;
    (D) determining whether said test passed in response to said response received from said device; and
    (E) configuring said storage array using said drive structure, wherein (i) said storage array is connected to a network switch after said drive structure passes said test on said device and (ii) said device allows testing of a configuration of said storage array without having said storage array connected to said network switch during testing.

2. The method according to claim 1, wherein said method captures said drive structure if said test passes.

3. The method according to claim 2, wherein said method analyzes said drive structure if said test does not pass.

4. The method according to claim 3, wherein said method repeats steps (B) through (D) for a subsequent test of said storage array.

5. The method according to claim 1, wherein said method implements steps (C) and (D) in a snooper device.

6. The method according to claim 1, wherein said method writes said structure to a file if said test passes.

7. The method according to claim 6, wherein said file comprises a XML file.

8. The method according to claim 6, wherein said file comprises a HTML file.

9. The method according to claim 6, wherein said file comprises a TXT file.

10. The method according to claim 1, wherein said test includes one or more of a variety of tests.

11. The method according to claim 1, wherein said storage array fills in an object graph in response to said first symbol call command.

12. The method according to claim 1, wherein said testing capabilities comprise snoop capabilities.

13. The method according to claim 1, wherein said device comprises a testing device configured to perform iterative testing on said configuration of said storage array prior to installing said storage array.

14. The method according to claim 1, wherein said test comprises one or more symbol calls.

15. The method according to claim 14, wherein said symbol calls are not dependent in an operating system.

16. The method according to claim 1, wherein said method reduces resources rendered to certify management applications.

17. The method according to claim 1, wherein said test does not need to wait for the operation of the storage array to complete.

18. The method according to claim 1, wherein said test interprets a symbol call in the form of an object graph structure.

19. The method according to claim 1, wherein said test links a symbol response.

20. The method according to claim 1, wherein said device is configured to send frames over an Ethernet network.

* * * * *